US012567669B2

(12) United States Patent
Ohshige

(10) Patent No.: US 12,567,669 B2
(45) Date of Patent: Mar. 3, 2026

(54) ANTENNA

(71) Applicant: CANON KABUSHIKI KAISHA, Tokyo (JP)

(72) Inventor: Reiya Ohshige, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 88 days.

(21) Appl. No.: 18/428,484

(22) Filed: Jan. 31, 2024

(65) Prior Publication Data

US 2024/0266739 A1 Aug. 8, 2024

(30) Foreign Application Priority Data

Feb. 3, 2023 (JP) ................................ 2023-015636

(51) Int. Cl.
*H01Q 7/00* (2006.01)
*H01Q 9/04* (2006.01)

(52) U.S. Cl.
CPC ............ *H01Q 7/00* (2013.01); *H01Q 9/0485* (2013.01)

(58) Field of Classification Search
CPC .............................. H01Q 7/00; H01Q 9/0485
See application file for complete search history.

(56) References Cited

U.S. PATENT DOCUMENTS 7,679,565 B2 * 3/2010 Sorvala ............... H01Q 1/2283 343/846
12,334,635 B2 * 6/2025 Blumberg, Jr. .......... H01Q 1/50
2003/0214992 A1 * 11/2003 Lester ..................... H01S 5/423 372/50.121
2004/0196874 A1 * 10/2004 Spiegelberg .......... H01S 3/0675 372/6
2009/0153429 A1 * 6/2009 Su .......................... H01Q 5/378 343/833
2013/0075477 A1 * 3/2013 Finn ..................... H01Q 1/2225 29/601
2014/0055316 A1 * 2/2014 Kasemodel ............ H01Q 21/06 156/60
2015/0235122 A1 * 8/2015 Finn ...................... H01F 27/363 235/492
2019/0190140 A1 * 6/2019 Lavin ..................... H01Q 1/422
2022/0013914 A1 * 1/2022 Han ...................... H01Q 9/0457
2022/0013915 A1 * 1/2022 Han ....................... H01Q 1/243

FOREIGN PATENT DOCUMENTS

JP 2020036287 A 3/2020

* cited by examiner

*Primary Examiner* — Thien M Le
(74) *Attorney, Agent, or Firm* — Canon U.S.A., Inc., IP Division

(57) ABSTRACT

An antenna includes a resonant element and a substrate. The resonant element resonates at a specific frequency. The substrate includes a dielectric material, a first surface on which a concave part having a diameter that is larger than a diameter of the resonant element is formed, and a second surface on which a metal element is arranged. A convex part is formed in a surface of the concave part and protrudes from the surface of the concave part. The resonant element is arranged in an end surface of the convex part, and the resonant element protrudes with respect to the first surface.

14 Claims, 4 Drawing Sheets

ANTENNA

BACKGROUND

Field

The disclosure relates to an antenna.

Description of the Related Art

A terahertz wave is an electromagnetic wave (radio wave) having an arbitrary frequency band in a region of millimeter waves to terahertz waves (30 GHz to 30 THz). An image formation apparatus (imaging apparatus) can acquire an image in a terahertz wave region by arranging, in an array form, electromagnetic wave sensors that can detect the terahertz wave, and providing a focus lens in front of the sensors. In addition, image acquisition in the terahertz wave region is useful in various fields. For example, a terahertz wave passes through cloth, fabric or the like, but does not easily pass through metal, and therefore an image formation apparatus using the terahertz wave is useful in the field of security such as detecting concealed weapons. In addition, a terahertz wave is also useful in the medical field. For example, since a cancer tissue and a healthy tissue have different refractive indices with respect to a terahertz wave, image formation of a biological tissue in the terahertz wave region is useful for detecting cancer cells of a patient.

A rectification element such as a Schottky Barrier Diode (SBD) is essential for a detection apparatus that detects a terahertz wave, and this kind of element is formed on a silicon substrate having a high dielectric constant. In addition, an electrode part formed of metal or the like having a high conductivity is necessary for operating an electronic element configured to rectify and oscillate.

However, when a dielectric material such as silicon having a high dielectric constant exists around the antenna, a part of electromagnetic waves radiated from the antenna is absorbed into the dielectric material, which causes a loss. In addition, also when metal exists around the antenna, electromagnetic waves radiated from the antenna may cause electric current to flow through the metal and affect radiation of the antenna, which may result in deteriorated antenna characteristics.

In contrast, a configuration is known, as disclosed in Japanese Patent Laid-Open No. 2020-036287, in which the directionality, impedance or the like is adjusted to improve antenna characteristics by effectively utilizing a parasitic element that is made of metal.

However, a terahertz wave requires a dielectric material having a high dielectric constant as described above, and even when the parasitic element described in Japanese Patent Laid-Open No. 2020-036287 is installed, the antenna characteristics may be consequently deteriorated by the dielectric material holding the parasitic element.

SUMMARY

The present disclosure provides information regarding an antenna that exhibits good antenna characteristics.

According to an aspect of the present disclosure, an antenna includes a resonant element configured to resonate at a specific frequency, and a substrate including a dielectric material, a first surface on which a concave part having a diameter that is larger than a diameter of the resonant element is formed, and a second surface on which a metal element is arranged, wherein a convex part is formed in a surface of the concave part and protrudes from the surface of the concave part, and wherein the resonant element is arranged in an end surface of the convex part, and the resonant element protrudes with respect to the first surface.

Further features of the present disclosure will become apparent from the following description of exemplary embodiments (with reference to the attached drawings).

DESCRIPTION OF THE EMBODIMENTS

Figure 1A:
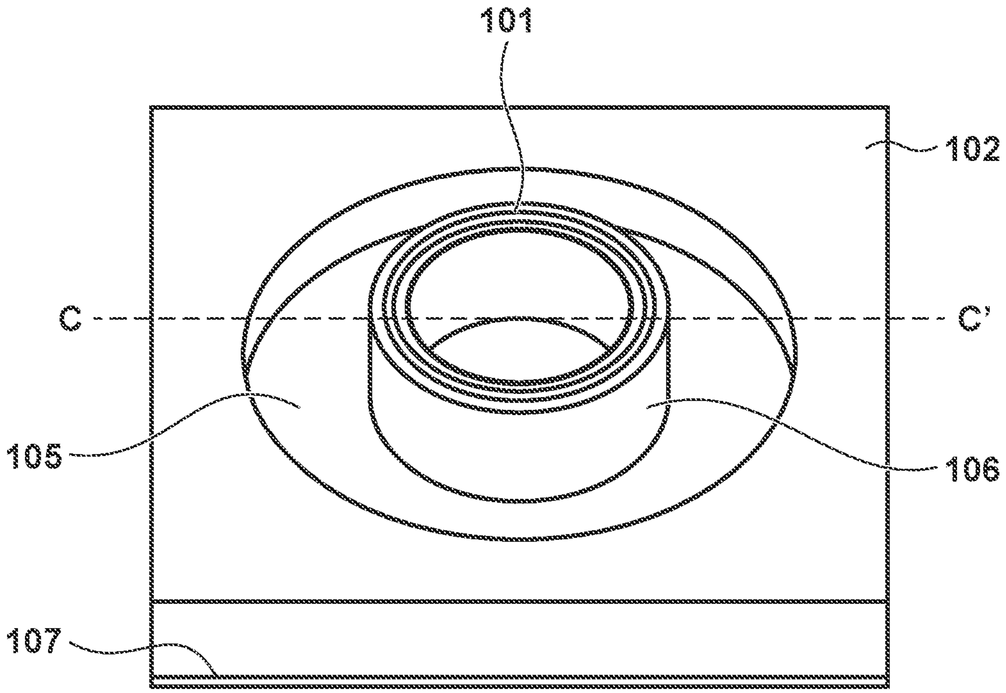
FIGS. 1A and 1B are diagrams illustrating a configuration example of an antenna according to a first embodiment.

Hereinafter, embodiments will be described in detail with reference to the attached drawings. Note, the following embodiments are not intended to limit the scope of the disclosure. Multiple features are described in the embodiments, but limitation is not made that requires all such features, and multiple such features may be combined as appropriate. Furthermore, in the attached drawings, the same reference numerals are given to the same or similar configurations, and redundant description thereof is omitted.

First Embodiment

Figure 1B:
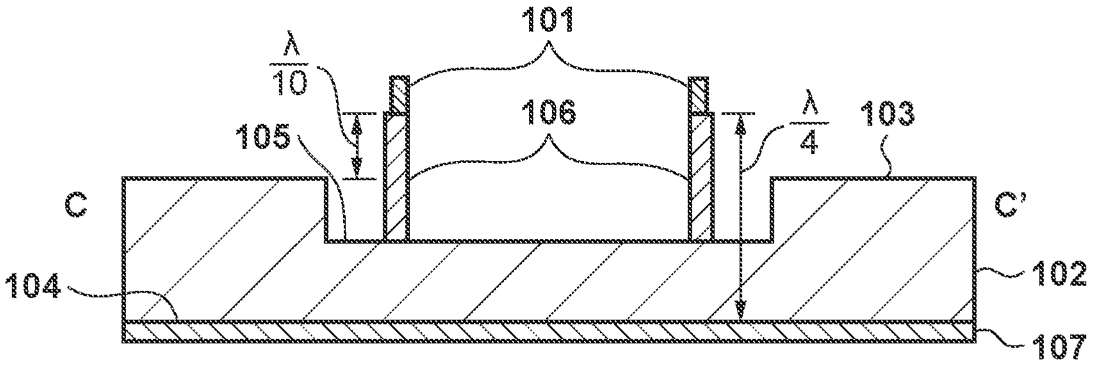

FIGS. 1A and 1B are diagrams illustrating a configuration example of an antenna according to a first embodiment. FIG. 1A is a perspective diagram, and FIG. 1B is a cross-sectional diagram taken along line C-C' in FIG. 1A. The antenna according to the present embodiment includes a resonant element 101 that resonates at a specific frequency (for example, in a terahertz band) and a substrate 102 including a dielectric material. The resonant element 101 is a loop shape element. The substrate 102 includes a first surface 103 and a second surface 104 opposite to the first surface 103. The substrate 102 is mainly formed of a dielectric material.

In the first surface 103, a concave part 105 is formed, which is concentric and has a radius larger than that of the resonant element 101 by about 1/10 times of the wavelength (resonant wavelength) $\lambda$ of the resonant frequency. In the concave part 105, a convex part 106 is arranged, which is a cylindrical dielectric material including the resonant element 101 on one end surface. In the second surface 104, a metal element 107 is arranged.

Although the resonant element 101 is illustrated as a loop shape having a circular shape in FIG. 1 as an example, the loop shape may have various shapes such as a square shape, a triangular shape, or the like. The length (total length) of the resonant element 101 is set such that the resonant element 101 can resonate at an operating frequency. For example, the length of the resonant element 101 may be 3/2 times (approximately 3/2 times) of the resonant wavelength $\lambda$. Here, the resonant wavelength $\lambda$ of the resonant element 101 is a wavelength at which an electromagnetic wave received by the resonant element 101 propagates through the antenna, and is also a wavelength of electric current flowing through the resonant element 101. In such a case, the resonant wavelength λ of the resonant element 101 can be determined based on the wavelength of the electromagnetic wave propagating through the dielectric material.

In addition, a silicon substrate or the like having a very high dielectric constant is used in handling electromagnetic waves in the terahertz band as described above, influence of the dielectric material on the antenna characteristics is large. However, influence on the antenna characteristics can be suppressed by arranging the dielectric material distant from the periphery of the antenna. Therefore, influence of the dielectric material around the antenna is suppressed by providing the concave part 105 in the substrate 102.

The concave part 105 is a concave part having a larger diameter than that of the resonant element 101, and is a circular concave part having a larger radius than the resonant element 101, for example. The concave part 105 may preferably include a concave surface having a diameter larger than that of the resonant element 101 by about 1/10 times of the resonant wavelength λ. Although the concave part 105 of the illustrated example has a circular shape conforming to the resonant element 101, the concave part 105 may have any shape such as a rectangular shape or a polygonal shape, provided that the influence of the dielectric material can be effectively suppressed.

In order to further suppress the influence of the dielectric material, the dielectric material is excluded (distantly arranged) from the periphery of the resonant element 101 by arranging the resonant element 101 at a higher position than the first surface 103, and forming the convex part 106 to be a cylindrical shape. As such, in a surface of the concave part 105, the cylindrical convex part 106 is formed protruding from the surface of the concave part 105, and the resonant element 101 arranged at the end surface of the convex part 106 is protruding with respect to the first surface 103. The convex part 106 may be a concentric cylindrical dielectric material having a radius substantially equal to the resonant element 101. In this case, the resonant element 101 and the first surface 103 may be preferably arranged to be separated from each other by about 1/10 times (or 1/10 times or more) of the resonant wavelength λ.

Although it is possible to further suppress the deterioration of the antenna characteristics by completely excluding the dielectric material from the periphery of the resonant element 101, it is necessary to take into account the strength as the substrate of the antenna element, or the possibility of arranging electronic elements other than the resonant element 101, or other elements. Therefore, the dielectric material is arranged such that the resonant element 101 can be held and the expandability of the substrate can be ensured while the dielectric material is excluded from the periphery of the resonant element 101 as much as possible. Such configuration of the present embodiment allows for implementing an antenna element exhibiting good antenna characteristics while maintaining the aforementioned properties.

In addition, a radiation pattern having a pattern like a figure eight shape can be normally obtained by a loop antenna, and there arises a possibility that electromagnetic waves may propagate to affect adjacent elements or the like when another substrate such as a drive circuit is connected to a lower part of the antenna element. And thus, when it is desirable to handle an electromagnetic wave in only one direction and obtain an array arrangement as for an image formation apparatus, a radiation pattern having a directionality in only one direction as with a patch antenna is suitable in order to increase the reception sensitivity.

In the present embodiment, a metal element 107 is provided on the second surface 104 in order to make the radiation pattern having a figure eight shape to be a radiation pattern having a directionality in only one direction. The metal element 107 is a metal plate (reflective plate, metal film) that covers at least a part or all of the second surface 104. The metal element 107 is arranged at a position separated from an aperture surface of the resonant element 101 by about 1/4 times (or 1/4 times or more) of the resonant wavelength λ. In other words, the resonant element 101 is separated from the metal element 107 on the second surface 104 by 1/4 times or more of the resonant wavelength. By arranging the metal element 107 in the aforementioned manner, the electromagnetic waves radiated toward the back side (downward direction in FIG. 1B) of the aperture surface of the resonant elements 101 can be reflected in the front direction (upward direction in FIG. 1B). In other words, a radiation pattern having a directionality only in the front direction and thus a higher gain can be obtained.

Here, the material, the material thickness, the shape, or other parameters described in the present embodiment are merely exemplary and any modification that provides a same effect is included in the present embodiment.

According to the present embodiment, the metal element is not arranged at the same height as a first surface, but the metal element is arranged on a second surface distant from the first surface, and a concave part is provided at a position where the resonant element is placed, and further, the resonant element is arranged at a position protruding toward an outside space with respect to the surrounding dielectric materials. Accordingly, it is possible to suppress the influence of a metal element (ground) or the influence of dielectric loss, thereby improving the antenna characteristics.

Second Embodiment

Conventionally, several operation principles of detection elements (detection apparatuses) that detect electromagnetic waves in the terahertz region have been proposed. According to one of the principles, electromagnetic waves propagating through a medium (e.g., air) surrounding the detection element are collected by an antenna, and a signal in a high-frequency region is converted into a signal in a low-frequency region by an electronic element including a rectification element. The low-frequency signal can be easily handled using a general electronic element. In addition, a Schottky barrier diode (SBD), a plasmon type Field Effect Transistor (FET), or the like may be used as the rectification element in the terahertz region.

In the present embodiment, a configuration of an antenna element, in which the basic configuration and the effect provide by the configuration are similar with the first embodiment, further having a practical function as a detection element will be described.

Figure 2A:
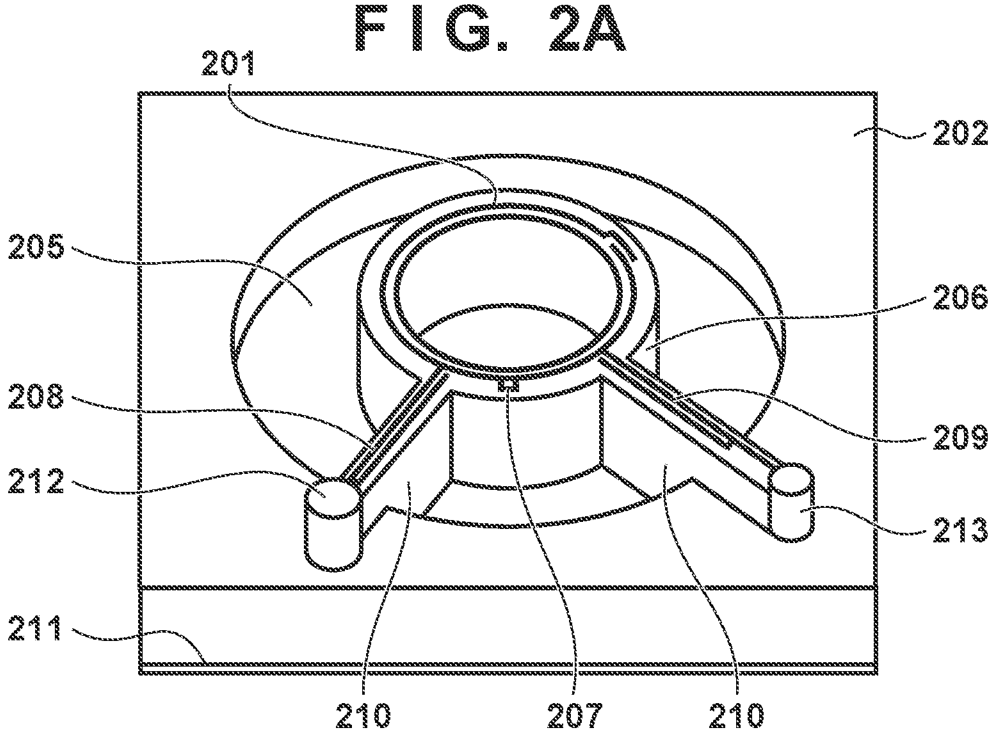
FIGS. 2A, 2B and 2C are diagrams illustrating a configuration example of an antenna according to a second embodiment.
Figure 2B:
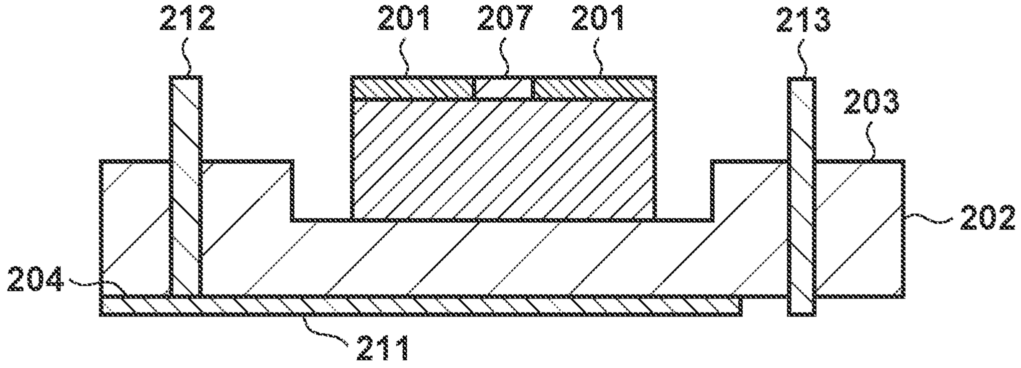
Figure 2C:
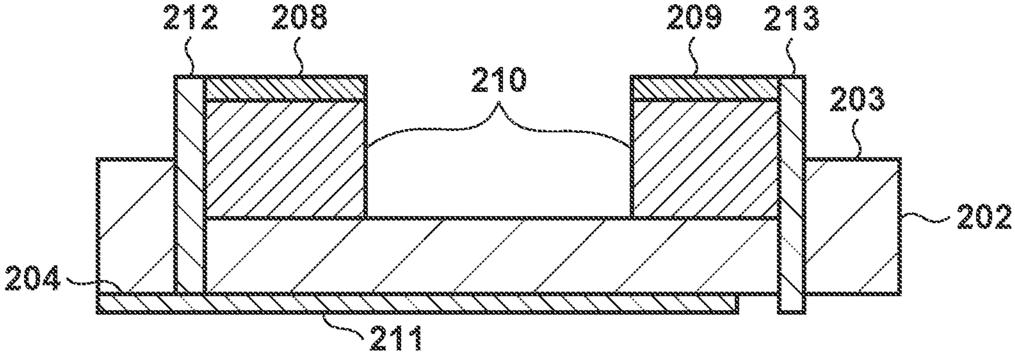

FIGS. 2A to 2C are diagrams illustrating a configuration example of an antenna according to a second embodiment. FIG. 2A is a perspective diagram, FIG. 2B is a cross-sectional diagram illustrating the vicinity of the resonant element 201, and FIG. 2C is a cross-sectional diagram illustrating the vicinity of signal line 208 and signal line 209. The antenna according to the present embodiment includes a loop shape resonant element 201 that resonates in a terahertz band, and a silicon substrate 202 including a dielectric material. The silicon substrate 202 is mainly formed of a dielectric material, and includes a first surface 203 and a second surface 204 provided on the opposite side of the first surface 203.

In the first surface 203, a concentric concave part 205 having a radius larger than that of the resonant element 201. In the concave part 205, a convex part 206 is provided, which is a cylindrical dielectric material including the resonant element 201 on one end surface. In the resonant element 201, an electronic element 207, which rectifies and oscillates signals in the terahertz band, is electrically connected to the resonant element 201. In other words, in the convex part 206, the resonant element 201 and the electronic element 207 are arranged.

The resonant element 201 includes a notch formed midway of the loop shape in order to operate the electronic element 207, where the ends of the notch are not connected in view of direct current but are connected in view of high-frequency.

Since the electronic element 207 such as a Schottky barrier diode that rectifies and oscillates is formed on the silicon substrate 202 or the like, the resonant element 201 should also be formed on the silicon substrate 202. In this case, the resonant element 201 and the first surface 203 may be preferably separated from each other by about 1/10 times (or 1/10 times or more) of the resonant wavelength λ in order to suppress the influence of silicon.

Further, the resonant element 201 includes signal line 208 and signal line 209 for connection to another substrate (not illustrated) such as a driving circuit configured for signal reading or an integrated circuit. The signal line 208 and the signal line 209 function as signal lines for applying voltage to the electronic element 207.

In addition, a plurality of connection dielectric material parts 210 connected to the convex part 206 are formed in order to hold (support) the signal line 208 and the signal line 209, respectively. In the present embodiment, two connection dielectric material parts 210 are formed. The plurality of connection dielectric material parts 210 may be configured to be formed integrally with the convex part 206 and extend from the convex part 206.

The signal line 208 and the signal line 209 are each connected to a node of an electric field of the resonant element 201 and form a stub preventing the resonating electromagnetic wave from flowing, in order not to disturb the state of the electromagnetic wave to which the resonant element 201 resonates. Here, the node of the electric field is a position where the electric field of the resonating electromagnetic wave in the resonant element 201 is minimum.

In the second surface 204, a metal element 211 is arranged, which is a ground of the resonant element 201 (electronic element 207), and also serves as a reflection plate that reflects electromagnetic waves. In this case, the metal element 211 is arranged at a position separated from the aperture surface of the resonant element 201 by about 1/4 times (or 1/4 times or more) of the resonant wavelength λ in a manner covering the entire second surface 204.

In addition, the signal line 208 is connected to the metal element 211 via an electrode 212 penetrating the silicon substrate 202 that is dielectric material. The signal line 209 is connected to a power supply unit (not illustrated) via an electrode 213 penetrating the silicon substrate 202 that is dielectric material. In this case, the metal element 211 around the electrode 213 is cut out to prevent a short circuit between the electrode 212 and the electrode 213.

Here, unlike an antenna such as a patch antenna formed of a metal flat plate, the resonant element 201, which is a loop antenna, is a ring-shaped metal, of which resonant mode facilitates propagation of terahertz waves into the silicon substrate 202. Therefore, when the loop shape resonant element 201 is used, terahertz waves may propagate into the silicon substrate 202, and the directionality of the antenna element may be disturbed due to re-radiation of terahertz waves caused by the electrode 212 and the electrode 213.

In other words, the influence of reception and re-radiation of terahertz waves by the electrode 212 and the electrode 213 can be suppressed by sufficiently separating the resonant element 201 from the electrode 212 and the electrode 213, and an antenna gain of the antenna element in the vertical direction can be increased.

Although the basic configuration is similar to that of the first embodiment in which metals and dielectric materials are arranged distant from the periphery of the resonant element 201, the present embodiment provides better antenna characteristics with a higher functionality by installing a practical function for transmitting and receiving terahertz waves with the electronic element 207, the signal line 208, the signal line 209, or the like.

Here, the material, the material thickness, the shape, or other parameters described in the present embodiment are merely exemplary and any modification that provides a same effect is included in the present embodiment.

The electrode 208 and the electrode 209 may be configured to be electrically connected to an integrated circuit included in another substrate that is different from the silicon substrate 202. In such a case, the second surface 204 and the other substrate may be bonded to each other.

<Analysis Result of Radiation Pattern>

Figure 3:
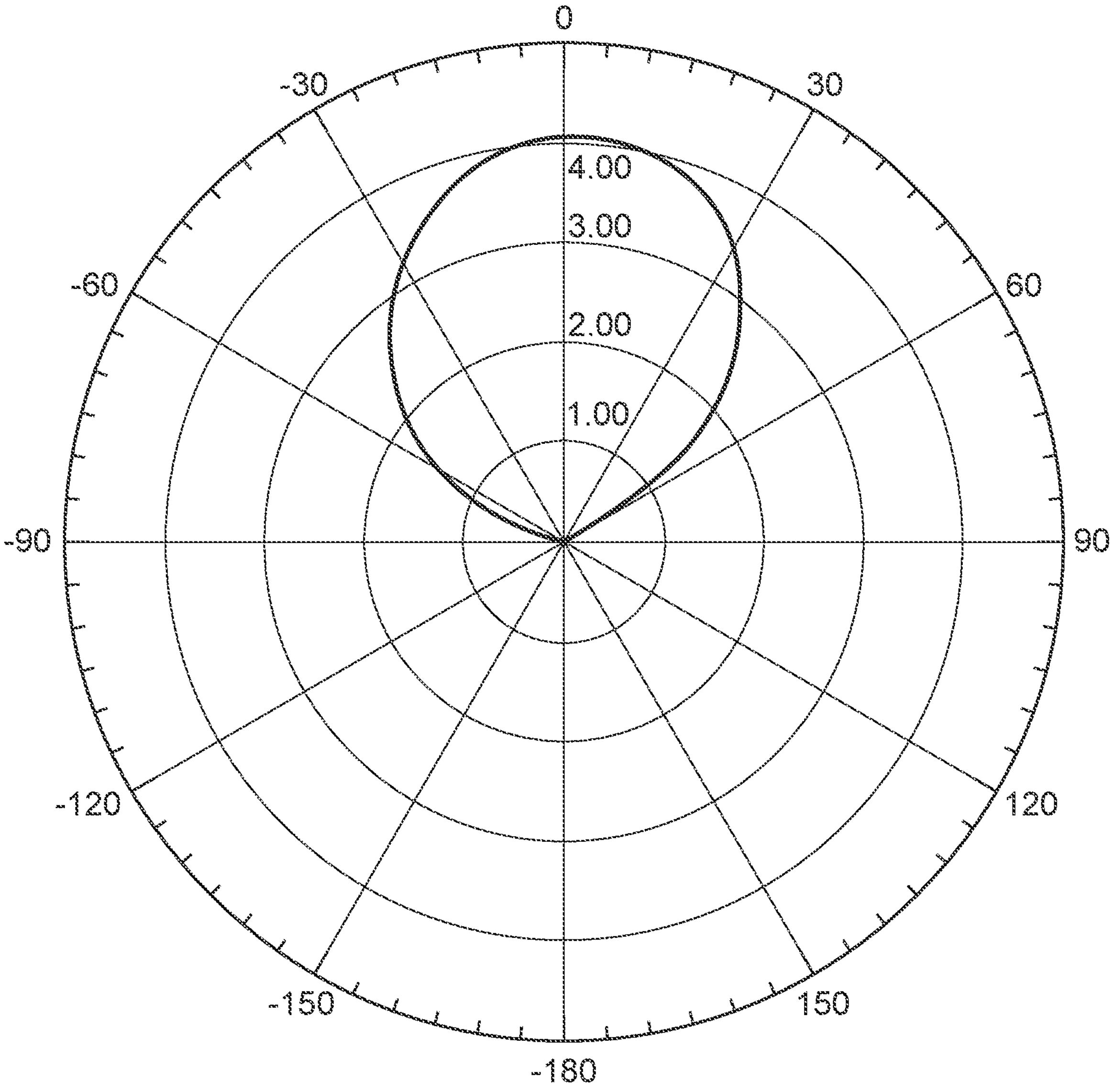
FIG. 3 is a diagram illustrating a simulation result of a radiation pattern of the antennas illustrated in FIGS. 2A, 2B and 2C.

In FIG. 3, an analysis result of a radiation pattern provided by a simulation for a case of using the antenna according to the present embodiment is illustrated. A radiation pattern in FIG. 3 is illustrated as seen from a similar direction with FIG. 2B or FIG. 2C, in which the upward direction is the front direction. Referring to FIG. 3, it can be confirmed that there is almost no radiation in the downward direction and a high gain is acquired in the upward direction.

<Configuration Example of Array Antenna>

Figure 4:
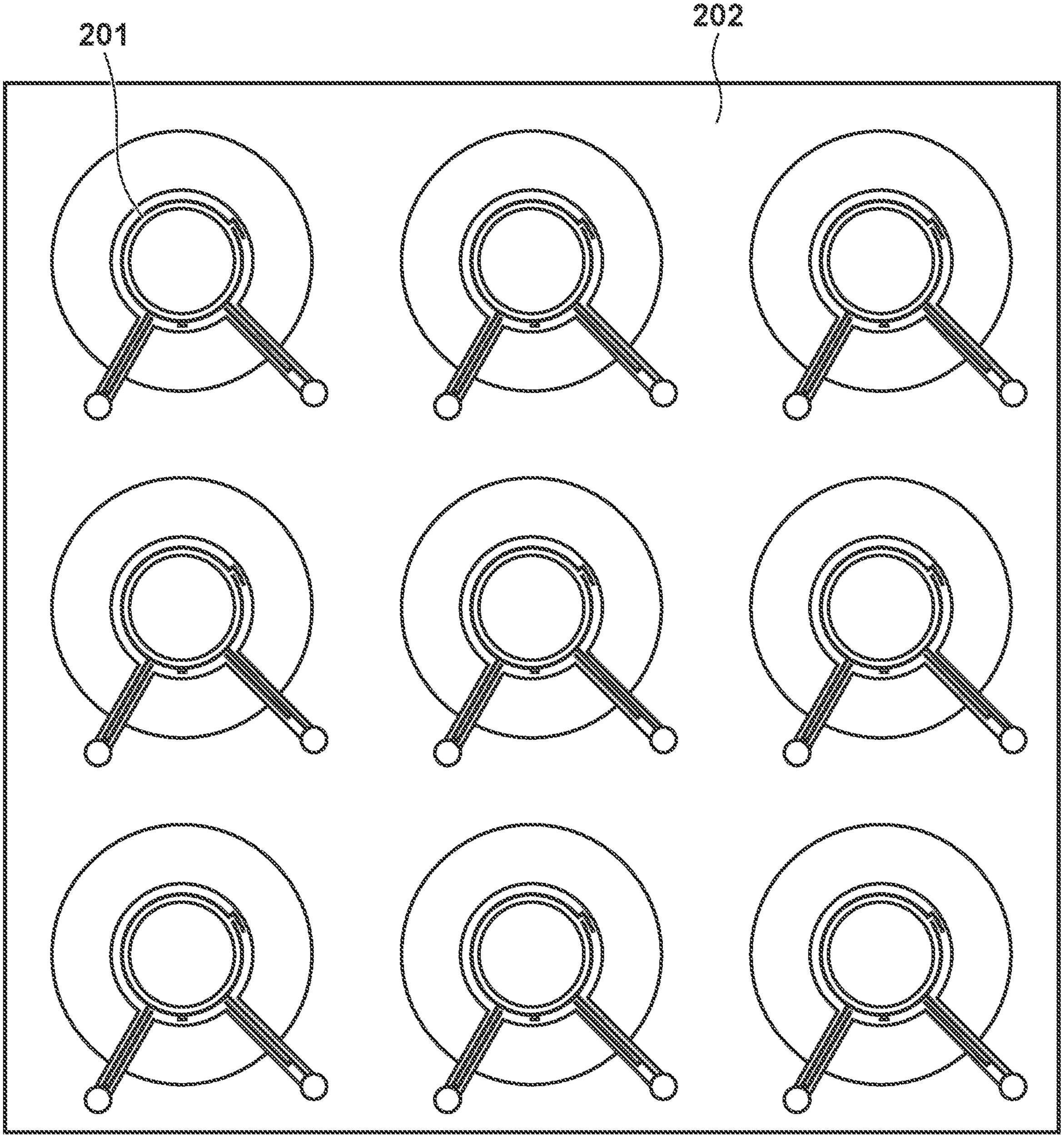
FIG. 4 is a diagram illustrating an example of an array arrangement of the antennas illustrated in FIGS. 2A, 2B and 2C.

Next, FIG. 4 is a diagram illustrating an example of an array antenna using the antenna element according to the present embodiment. FIG. 4 is a diagram of the silicon substrate 202 seen from the vertical direction, where the resonant elements 201 are arranged in a 3×3 array. A resonant element 201 is separated from the center of an adjacent resonant element 201 by about 3/4 times (or 3/4 times or more) of the resonant frequency λ, and such an array arrangement allows for retrieving signals without interference between the antenna elements.

In addition, the metal element 211 may be connected between adjacent antenna elements. In such a case, it is possible to provide the design of a drive circuit board (not illustrated) connected to the antenna element with an expandability that, for example, allows the ground to be connected from an end part of the array arrangement.

According to each of the aforementioned embodiments, as has been described above, the antenna is arranged at a position higher than the dielectric material and the metal is arranged further distant from the dielectric material, in order to suppress the influence of the dielectric material and the metal around the antenna (resonant element). The foregoing allows for improving the antenna characteristics.

Although an antenna for the terahertz band is largely deteriorated in the antenna characteristics due to the dielectric material having a high dielectric constant and the metal around the antenna, the aforementioned embodiment can provide an antenna having good antenna characteristics even in the terahertz band.

According to the present disclosure, it is possible to provide an antenna having good antenna characteristics.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-015636, filed Feb. 3, 2023, which is hereby incorporated by reference herein in its entirety.

What is claimed is:

1. An antenna comprising:
- a resonant element configured to resonate at a specific frequency; and
- a substrate including a dielectric material, a first surface on which a concave part having a diameter that is larger than a diameter of the resonant element is formed, and a second surface on which a metal element is arranged,
- wherein a convex part is formed in a surface of the concave part and protrudes from the surface of the concave part,
- wherein the resonant element is arranged in an end surface of the convex part, and the resonant element protrudes with respect to the first surface, and
- wherein the concave part is a circular concave part having a radius that is larger than that of the resonant element, and the convex part is a concentric cylindrical dielectric material having a radius substantially equal to the resonant element.

2. The antenna according to claim 1, wherein the resonant element is separated from the first surface by 1/10 times or more of a resonant wavelength.

3. The antenna according to claim 1, wherein the resonant element is separated from the metal element in the second surface by ¼ times or more of a resonant wavelength.

4. The antenna according to claim 1, wherein the metal element is a metal plate covering at least a part of the second surface.

5. The antenna according to claim 1, wherein the metal element is a ground of the resonant element.

6. The antenna according to claim 1, wherein the second surface is a surface opposite to the first surface.

7. The antenna according to claim 1, wherein the resonant element is loop shape, and a length of the resonant element is 3/2 times of a resonant wavelength.

8. The antenna according to claim 1, wherein a frequency at which the resonant element resonates is in a terahertz band.

9. An antenna comprising:
- a resonant element configured to resonate at a specific frequency; and
- a substrate including a dielectric material, a first surface on which a concave part having a diameter that is larger than a diameter of the resonant element is formed, and a second surface on which a metal element is arranged,
- wherein a convex part is formed in a surface of the concave part and protrudes from the surface of the concave part, and
- wherein the resonant element is arranged in an end surface of the convex part, and the resonant element protrudes with respect to the first surface,
- wherein the antenna further comprises:
- an electronic element configured to rectify and oscillate signals in a terahertz band; and
- a first signal line and a second signal line configured to apply voltage to the electronic element,
- wherein the electronic element is electrically connected to the resonant element, and
- wherein the first signal line and the second signal line are respectively electrically connected to the resonant element at a position where an electric field of an electromagnetic wave in the antenna is minimum.

10. The antenna according to claim 9, further comprising:
- a first connection dielectric material part connected to the convex part and configured to hold the first signal line; and
- a second connection dielectric material part connected to the convex part and configured to hold the second signal line.

11. An antenna comprising:
- a resonant element configured to resonate at a specific frequency; and
- a substrate including a dielectric material, a first surface on which a concave part having a diameter that is larger than a diameter of the resonant element is formed, and a second surface on which a metal element is arranged,
- wherein a convex part is formed in a surface of the concave part and protrudes from the surface of the concave part,
- wherein the resonant element is arranged in an end surface of the convex part, and the resonant element protrudes with respect to the first surface, and
- wherein the antenna further comprises:
- a first electrode penetrating between the first surface and the second surface of the substrate; and
- a second electrode penetrating between the first surface and the second surface of the substrate.

12. The antenna according to claim 11, further comprising:

a first signal line connecting the resonant element and the first electrode; and a second signal line connecting the resonant element and the second electrode.

13. The antenna according to claim 11, wherein the first electrode is connected to the metal element in the second surface, and the second electrode is connected to a power supply unit.

14. The antenna according to claim 11, wherein the first electrode and the second electrode are electrically connected to an integrated circuit included in another substrate that is different from the substrate including the dielectric material, and the other substrate is bonded to the second surface.

* * * * *